(12) United States Patent
Lin et al.

(10) Patent No.: US 8,179,683 B2
(45) Date of Patent: May 15, 2012

(54) DISPLAY DEVICE

(75) Inventors: Huang-Pin Lin, Taipei County (TW);
Chien-Cheng Lin, Taipei County (TW);
Jian-Lin Chen, Taipei County (TW);
Kuan-Yu Chen, Taipei County (TW);
Yi-An Chien, Taipei County (TW);
Hung-Tsai Weng, Taipei County (TW)

(73) Assignee: AmTRAN TECHNOLOGY Co., Ltd, New Taipei (TW)

( * ) Notice: Subject to any disclaimer, the term of this patent is extended or adjusted under 35 U.S.C. 154(b) by 662 days.

(21) Appl. No.: 12/389,381

(22) Filed: Feb. 20, 2009

(65) Prior Publication Data

US 2010/0214198 A1 Aug. 26, 2010

(51) Int. Cl.
*G09G 3/32* (2006.01)
(52) U.S. Cl. ........................... 361/749; 345/204
(58) Field of Classification Search ............. 345/82
See application file for complete search history.

(56) References Cited

U.S. PATENT DOCUMENTS

2006/0285362 A1* 12/2006 Cho et al. ............... 362/633
* cited by examiner

*Primary Examiner* — Quan-Zhen Wang
*Assistant Examiner* — Tony Davis
(74) *Attorney, Agent, or Firm* — Jianq Chyun IP Office

(57) ABSTRACT

A display device includes a display panel, a flexible printed circuit and a back light module. The flexible printed circuit is suitable for supporting the driving element and is electrically connected to the display panel. The back light module includes at least one light source, a first frame and a second frame. The second frame surrounds the light source, the first frame surrounds the second frame, and the display panel and the flexible printed circuit are disposed at one side of the first frame, wherein the first frame has at least an opening, the second frame has a element contacting surface, the driving element is disposed on the flexible printed circuit, and the element contacting surface protrudes from the opening for being connected to the driving element.

20 Claims, 3 Drawing Sheets

DISPLAY DEVICE

BACKGROUND OF THE INVENTION

1. Field of the Invention

The present invention generally relates to a display device. More particularly, the present invention relates to a display device for dissipating heat from a driving element through a second frame.

2. Description of Related Art

The modern life style has called for a thinner and lighter display apparatus. Although the traditional display apparatus made of cathode ray tubes has its own advantages, its bulky size and the radiation emitted during display is still a problem. As a result, a new development combining optoelectronics and semiconductor manufacturing technologies, the flat panel display (FPD), including liquid crystal display (LCD), organic electro-luminescent display (OELD) and plasma display panel (PDP), has become the mainstream display product.

Referring to FIG. 1 which is a partially cross-sectional views schematically illustrating a flat display device 100, a conventional driving element 110 is contacted with the outer frame 120, such that the heat generated by the driving element 110 is conducted to external space through the outer frame 120 for decreasing the temperature of the driving element 110. The outer frame 120 is a bezel of the flat display device 100 and can be a metal frame. A plastic frame with colorful paint is used to cover the metal frame commonly for aesthetic feeling, such that the heat conduction between the outer frame 120 and cold air is affected. Referring to FIG. 1, the conventional driving element 110 is disposed on the flexible printed circuit 108 and fronts the outer frame 120. Another side of the of the flexible printed circuit 108 is near the back light module 130, and the flexible printed circuit 108 and the second frame 132 are separated by the first frame 134 of the back light module 130, such that the heat of the driving element 110 is only able to be dissipated by the outer frame at front side, but the dissipating efficiency of the whole structure is unable to be further increased.

SUMMARY OF THE INVENTION

The present invention is to provide a display device for dissipating heat from a driving element through a second frame, such that the dissipating efficiency of the whole structure is increased.

As embodied and broadly described herein, the present invention provides a display device. The display device includes a display panel, a flexible printed circuit and a back light module. The flexible printed circuit is suitable for supporting the driving element and is electrically connected to the display panel. The back light module includes at least one light source, a first frame and a second frame. The second frame surrounds the light source, the first frame surrounds the second frame, and the display panel and the flexible printed circuit are disposed at one side of the first frame, wherein the first frame has at least an opening, the second frame has a element contacting surface, the driving element is disposed on the flexible printed circuit, and the element contacting surface protrudes from the opening for being connected to the driving element.

According to an embodiment of the present invention, the display device further includes a control circuit disposed at another side of the first frame, wherein the control circuit is electrically connected to the display panel by the flexible printed circuit.

According to an embodiment of the present invention, the control circuit includes a timing control circuit.

According to an embodiment of the present invention, the driving element includes a source driving circuit.

According to an embodiment of the present invention, the first frame is a plastic frame.

According to an embodiment of the present invention, the second frame is a metal frame.

According to an embodiment of the present invention, the light source includes a lamp or a light emitting diode.

According to an embodiment of the present invention, the second frame has a concave structure protrudes from the opening.

According to an embodiment of the present invention, the display panel includes a liquid crystal display panel.

According to an embodiment of the present invention, the display device further comprising a ground slice, connected between the element contacting surface and the driving element.

In summary, the driving element of the present invention is disposed at the inner side of the flexible printed circuit and fronts the opening of the first frame. When the flexible printed circuit is assembled to the display device, the heat generated by the driving element is directly conducted to the second frame of the back light module. The convection area between the second frame and the cold air is larger, such that the heat conduction is obviously promoted and the dissipating efficiency of the whole structure is increased.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
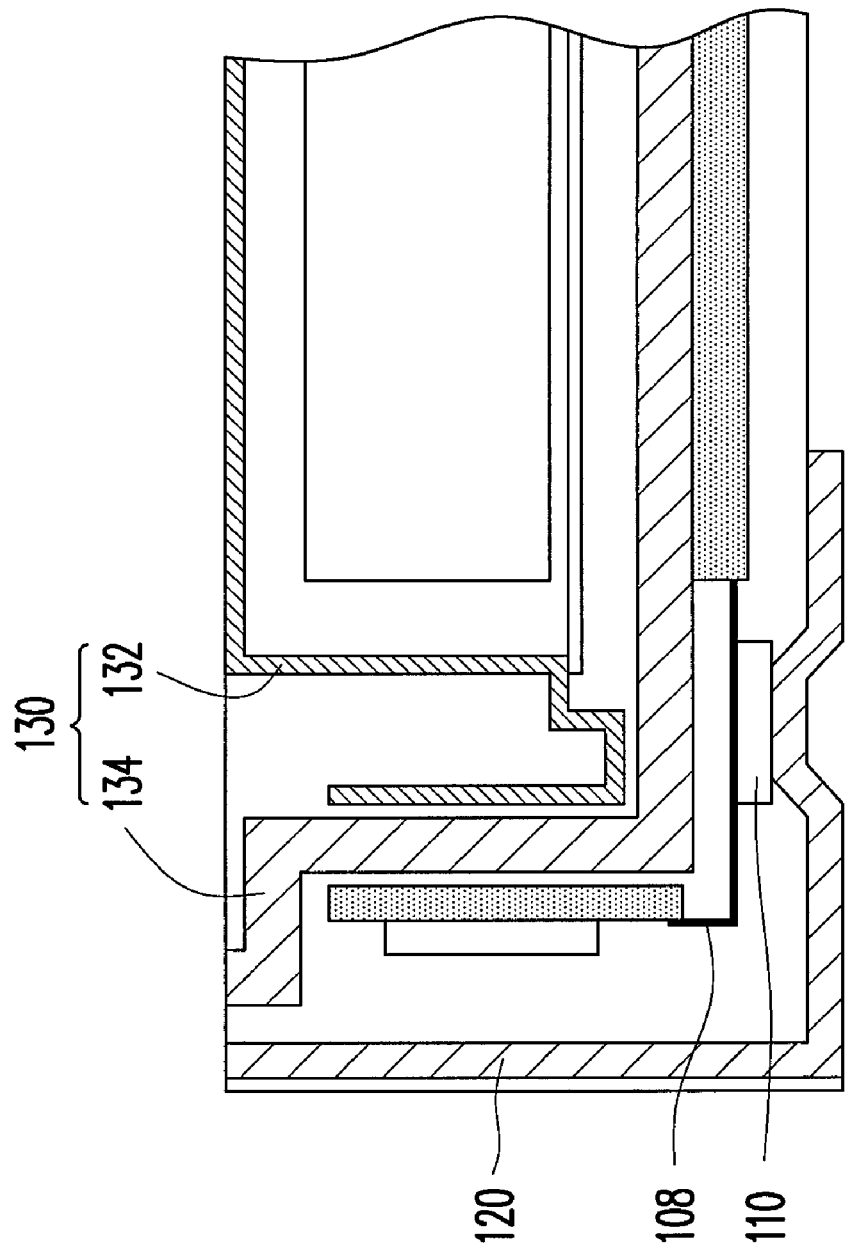
FIG. 1 is a partially cross-sectional view showing a conventional display device.

Reference will now be made in detail to the present embodiments of the invention, examples of which are illustrated in the accompanying drawings. Wherever possible, the same reference numbers are used in the drawings and the description to refer to the same or like parts.

Figure 2:
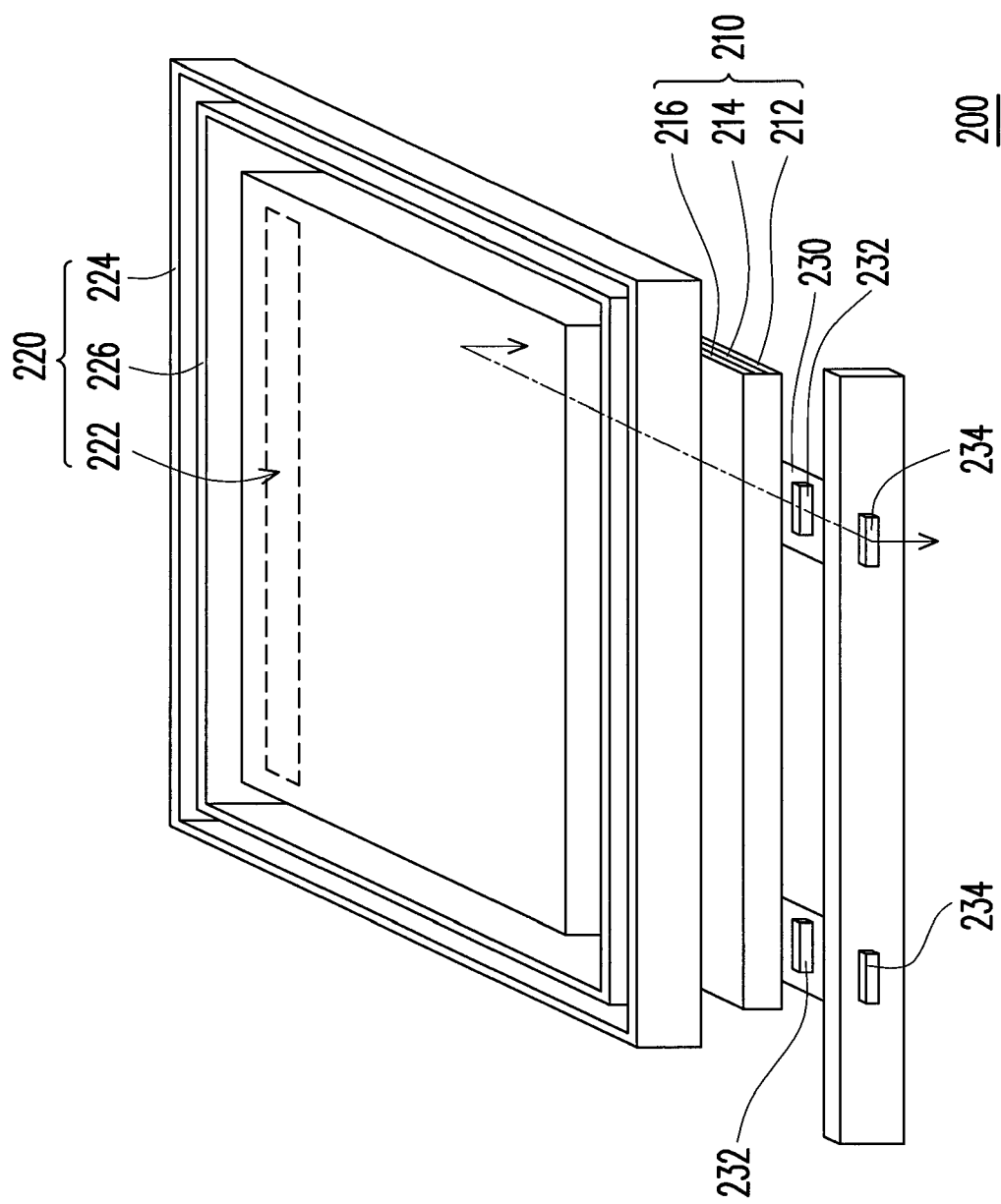
FIG. 2 is an exploded view showing an embodiment of the display device of the present invention.
Figure 3:
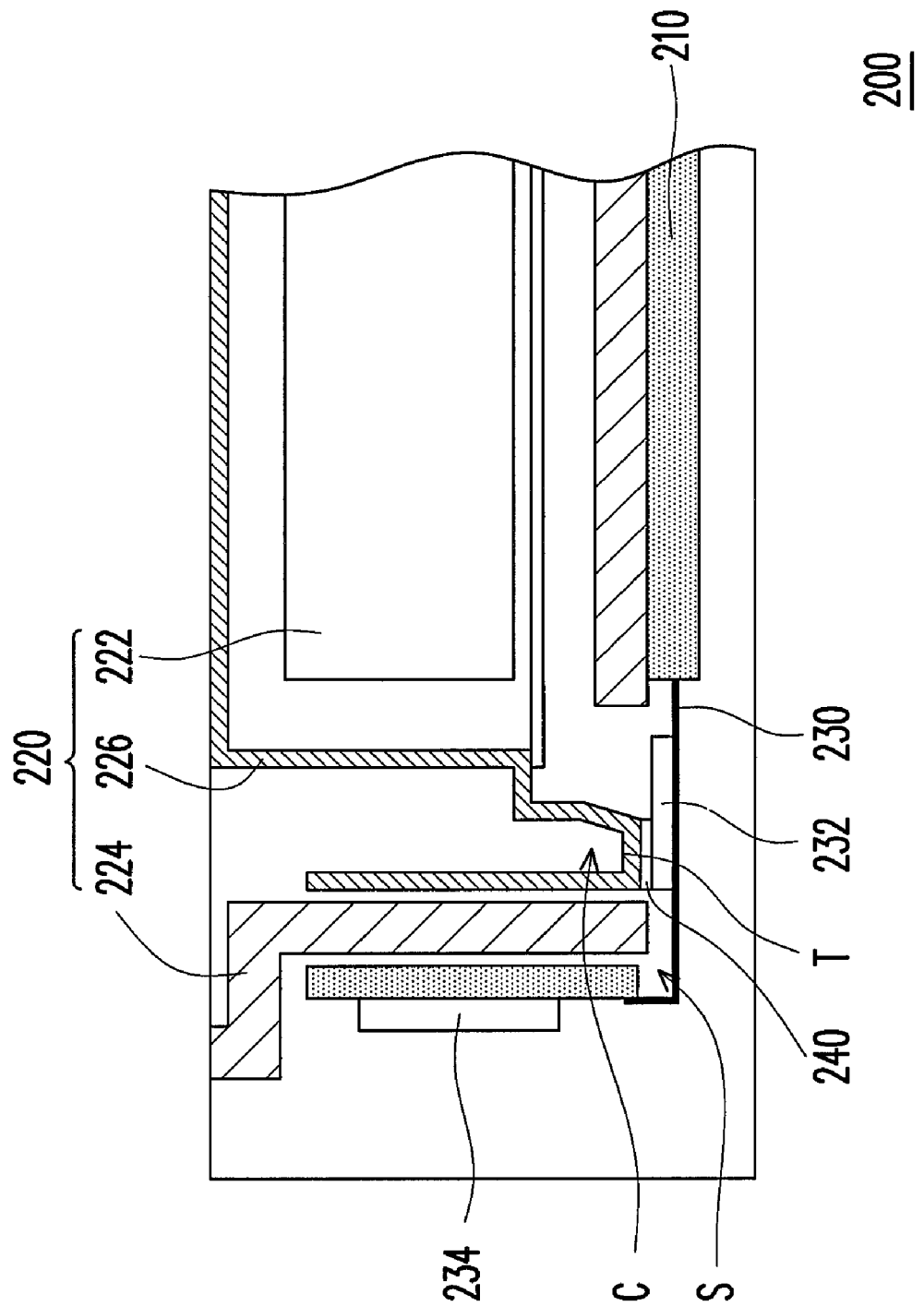
FIG. 3 is a partially cross-sectional view showing the display device in FIG. 2.

FIG. 2 is an exploded view showing an embodiment of the display device of the present invention. FIG. 3 is a partially cross-sectional view showing the display device in the FIG. 2.

Referring to FIG. 2 and FIG. 3, the display device 200 includes a display panel 210, a back light module 220, and a flexible printed circuit 230. The display panel 210 is for example a liquid crystal display panel, and the flexible printed circuit 230 is suitable for supporting the driving element 232 and is electrically connected to the display panel for the display panel 210 to display the needed frame or dynamic images. The back light module 220 comprises at least one light source 222, a first frame 224 and a second frame 226. The second frame 226 surrounds the light source 222, and the first frame 224 surrounds the second frame for providing a flat light source for the display panel 210. Particularly, the display panel 210 can be any kind of display panel or a conventional display panel such as a transmissive, a reflective or a transflective display panel. The invention has no limit about this. In this embodiment, the structure of the display panel 210 includes a first substrate 212, a liquid crystal layer 214 and a second substrate 216, wherein the liquid crystal layer 214 is disposed between the first substrate 212 and the second substrate 216. Scan lines, data lines, active elements and pixel electrodes (not shown) are disposed on the second substrate 216, and common electrodes (not shown) are disposed on the first substrate 212. When a driving voltage is formed between the pixel electrodes and the common electrodes, the liquid crystal molecules in the liquid crystal layer 214 are arranged according to the distribution of the electric field.

Besides, the back light module 220 is for example a direct-type back light module or a side-type back light module. The back light module 220 is disposed at the second substrate 216 near the liquid crystal panel 210, and the light generated by the light source 222 is able to be passed through a diffuser or be refracted by a light-guiding plate for being forward to the liquid crystal panel uniformly. The light source 222 is for example a cold cathode fluorescent light, a hot cathode fluorescent light or a light emitting diode.

In the FIG. 3, the flexible printed circuit 230 and the display panel 210 are disposed at the front side of the first frame 224, and the control circuit 234 disposed at the outer side of the first frame 224 is able to be electrically connected to the display panel 210 by the flexible printed circuit 230. It is noticed that the flexible printed circuit 230 has a driving element 232 which fronts the back light module 220. The driving element 232 can be a source driving circuit. The driving element 232 is electrically connected to data lines of the display panel 210 by the flexible printed circuit 230 of flexible material, and the timing control circuit 234 generates a clock signal for the source driving circuit, such that the source driving circuit generates data signals for the display panel 210 at different time intervals respectively. The difference between the present invention and the conventional technique is that the driving element of conventional technique fronts the outer frame, not fronts the back light module. In the present invention, the driving element 232 is designed to be on the inner surface of the flexible printed circuit 230, such that the driving element 232 fronts the back light module 220.

Referring to the FIG. 3, the first frame 224 of the back light module 220 has at least an opening S, and the second frame 226 has an element contacting surface T. A appropriate space is reserved by the opening S for the element contacting surface T to be contacted with the driving element 232 through the opening S. In the FIG. 3, the display panel 210, the flexible printed circuit 230 are disposed at the front side of the first frame 224, and the second frame 226 is disposed at the back side of the first frame 224. The position of the opening S is corresponding to the position of the driving element 232, and the element contacting surface T protrudes from the opening S for being contacted with the driving element 232, wherein the second frame 226 is able to be integrated with a concave structure C by manufacturing. Thus, the driving element 232 is able to be dissipated by the second frame 226 for conducting the heat generated by the driving element 232 to external space through the second frame 226, and need not be dissipated through the outer frame at the front side. Besides, in this embodiment, the display device 200 further includes a ground slice 240 connected between the element contacting surface T and the driving element 232.

In particularly, the first frame 224 of the back light module 220 is for example a hollow plastic frame suitable for encapsulating the periphery of a diffuser or a light-guiding plate, and the second frame 226 is for example a metal frame suitable for containing the light source 222 and other elements. The first frame 224 and the second frame 226 are assembled (by being stuck or locked) to each other for encapsulating the light source 222 and other elements. For increasing the conducting efficiency, a thermal paste can be formed between the driving element 232 and the element contacting surface T. The thermal paste is for example silver paste or other equivalent materials. Besides, the number of the opening S can be one or more that depends on the arrangement and position of the driving element 232. The invention has no limit about this.

In this embodiment, the driving element 232 is directly contacted with the second frame 226 of the back light module 220 and need not be conducted by the outer frame, such that the outer frame of conventional outer frame for conducting is not needed anymore. A frame of other material or the plastic frame suitable for encapsulating the outer frame originally is able to substitute the outer frame, such that the whole structure of the display panel is simplified for decreasing the whole cost of the display device 200.

In summary, the driving element of the present invention is disposed at the inner side of the flexible printed circuit and fronts the opening of the first frame. When the flexible printed circuit is assembled to the display device, the heat generated by the driving element is directly conducted to the second frame of the back light module. The conducting area between the second frame and the cold air is larger, such that the heat conduction is obviously promoted and the dissipating efficiency of the whole structure is increased. Besides, when the flexible printed circuit is assembled to the display device, the high frequency signal generated by the control circuit is directly conducted to the second frame of the back light module through the ground slice, such that the signal transmitting path is shortened and the interference from the high frequency signal to other electrical elements is prevented. Thus, the present invention is provided with both practicability and originality.

It will be apparent to those skilled in the art that various modifications and variations may be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:
   a display panel;
   a flexible printed circuit, suitable for supporting a driving element and electrically connected to the display panel; and
   a back light module, comprising at least one light source, a first frame and a second frame, wherein the second frame surrounds the light source, the first frame surrounds the second frame, and the display panel and the flexible printed circuit are disposed at one side of the first frame, wherein the first frame has at least an opening, the second frame has a element contacting surface, the driving element is disposed on an inner surface of the flexible printed circuit, such that the driving element fronts the back light module, and the element contacting surface protrudes from the opening for being connected to the driving element.

2. The display device as claimed in claim 1, further comprising a control circuit, disposed at another side of the first frame, wherein the control circuit is electrically connected to the display panel by the flexible printed circuit.

3. The display device as claimed in claim 1, wherein the control circuit comprises a timing control circuit.

4. The display device as claimed in claim 1, wherein the driving element comprises a source driving circuit.

5. The display device as claimed in claim 1, wherein the first frame is a plastic frame.

6. The display device as claimed in claim 1, wherein the second frame is a metal frame.

7. The display device as claimed in claim 1, wherein the light source comprises a lamp or a light emitting diode.

8. The display device as claimed in claim 1, wherein the second frame has a concave structure protrudes from the opening.

9. The display device as claimed in claim 1, wherein the display panel comprises a liquid crystal display panel.

10. The display device as claimed in claim 1, further comprising a ground slice, connected between the element contacting surface and the driving element.

11. A flat display module for a display device including a display panel and a flexible printed circuit, the flexible printed circuit being suitable for supporting a driving element and electrically connected to the display panel, the flat display module comprising:
    a back light module having at least one light source;
    a first frame, having at least an opening, the display panel and the flexible printed circuit being disposed at one side of the first frame; and
    a second frame, surrounding the light source, the first frame surrounding the second frame, wherein the second frame has an element contacting surface, the driving element is disposed on an inner surface of the flexible printed circuit, such that the driving element fronts the back light module, and the element contacting surface protrudes from the opening for being connected to the driving element.

12. The flat display module as claimed in claim 11, wherein the display device further comprises a control circuit, disposed at another side of the first frame, wherein the control circuit is electrically connected to the display panel by the flexible printed circuit.

13. The flat display module as claimed in claim 11, wherein the second frame has a concave structure protrudes from the opening.

14. The flat display module as claimed in claim 11, wherein the display device further comprises a ground slice, connected between the element contacting surface and the driving element.

15. The flat display module as claimed in claim 11, wherein heat generated from the driving element is dissipated by the second frame.

16. An electronic device, comprising:
    a back light module having at least one light source;
    a flexible printed circuit supporting a driving element;
    a first frame, having at least an opening, the flexible printed circuit being disposed at one side of the first frame; and
    a second frame, surrounding the light source, the first frame surrounding the second frame, wherein the second frame has an element contacting surface, the driving element is disposed on an inner surface of the flexible printed circuit, such that the driving element fronts the back light module, and the element contacting surface protrudes from the opening for being connected to the driving element.

17. The electronic device as claimed in claim 16, wherein the electronic device further comprises a control circuit, disposed at another side of the first frame, wherein the control circuit is electrically connected to the flexible printed circuit.

18. The electronic device as claimed in claim 16, wherein the second frame has a concave structure protrudes from the opening.

19. The electronic device as claimed in claim 16, wherein the display device further comprises a ground slice, connected between the element contacting surface and the driving element.

20. The electronic device as claimed in claim 16, wherein heat generated from the driving element is dissipated by the second frame.

* * * * *